United States Patent [19]

Postlewait et al.

[11] Patent Number: 5,014,210

[45] Date of Patent: May 7, 1991

[54] MICROPROCESSOR CONTROLLED SOLDERING STATION

[76] Inventors: Lester B. Postlewait, 7 Chatham Trace; Paul L. Urban, 209 Fund Erburk Dr., both of Cheraw, S.C. 29520

[21] Appl. No.: 319,603

[22] Filed: Mar. 6, 1989

[51] Int. Cl.$^5$ .......................... H05B 1/02; G06F 15/46
[52] U.S. Cl. ...................................... 364/477; 219/241; 219/434; 364/188
[58] Field of Search .................. 364/477, 468, 188; 219/482, 483, 484, 490, 241, 247, 85.1, 494, 240; 228/8, 9

[56] References Cited

U.S. PATENT DOCUMENTS

| 4,698,774 | 10/1987 | Abe et al. | 364/477 |
| 4,861,967 | 8/1989 | YHoshimura | 219/241 |
| 4,891,497 | 1/1990 | Yoshimura | 219/241 |

Primary Examiner—Jerry Smith
Assistant Examiner—Paul Gordon
Attorney, Agent, or Firm—Kenyon & Kenyon

[57] ABSTRACT

A soldering system includes M soldering tools, where M is $\geq 1$ and is an integer and N soldering tips where N is $\geq 1$ and is an integer with one of the N tips attached to one of the M soldering tools. The soldering system also includes a control circuit connected to the one tool having the one tip attached to it. The control circuit maintains the one tip at a desired temperature. The control circuit has a device for inputting the desired temperature at which the control circuit maintains the temperature of the one tip. In a preferred embodiment, each of the N tips have an identity and each of the M tools have an identity. The control circuit maintains the one tip attached to the one tool at a desired temperature which is inputted into the control circuit through the input device. The control circuit identifies which of the N tips is attached to the tool by the identity of the one tip attached to the one tool being inputted into the control circuit through the input. The control circuit also determines the identity of the one tool connected to the control circuit.

14 Claims, 7 Drawing Sheets

MICROPROCESSOR CONTROLLED SOLDERING STATION

BACKGROUND AND DISCUSSION OF THE INVENTION

The present invention relates to soldering systems, and specifically to microprocessor-controlled soldering systems which enable a desired temperature to be maintained in one of a number of soldering tips used in the system. The desired temperature, tool and tip are inputted by a user, and a microprocessor evaluates the information selected with its data base to control the soldering operation.

Soldering tools are used to provide for a multitude of permanent electrical and mechanical connections. For each such connection, there is typically an optimum tip style, temperature, and solder formulation for the location of the connection. In order to accommodate all possible connections and soldering materials, a multitude of different tools and tips are required from which the proper selection can be made. The apparatus providing the heat to the tips must have different power ratings to be compatible with the particular tip employed. Users often have a large array of tools and tips accessible for use in one of the multitude of soldered connections to insure an optimal connection. Even if the user has access to a multitude of tips and tools, often the desired temperature for which a given tool was rated is not accurate. There can be oscillations in the tip temperature or droop present in he tool that are not properly compensated during operation, rendering the tool inappropriate for the task.

The present invention overcomes the problems noted above by means of a controlled soldering system that can provide a desired temperature to a tip and otherwise accommodate a particular soldering environment. The desired temperature is selected by a user and inputted into a microprocessor controlled system. The desired temperature is then maintained over the course of the soldering operation. The system has the flexibility to be programmed for a variety of tips and tools.

More specifically, the soldering system comprises a number M of soldering tools, where M is an integer $\geq 1$, and a number N of soldering tools, where N is an integer $\geq 1$. The soldering system also includes a control circuit connected to a selected tool having one of the tips attached thereto. The control circuit provides for inputting the desired temperature by the user and maintaining the temperature of the one tip to that input. The control circuit identifies which of the N tips is attached to the M tool by interrogating certain information inputted into the control circuit by the user.

The above is a brief description of the prior art and features of the invention. Other advantages will be apparent to those skilled in the art from the detailed discussion of the preferred embodiment which follows.

DESCRIPTION OF THE PREFERRED EMBODIMENT

Figure 1:
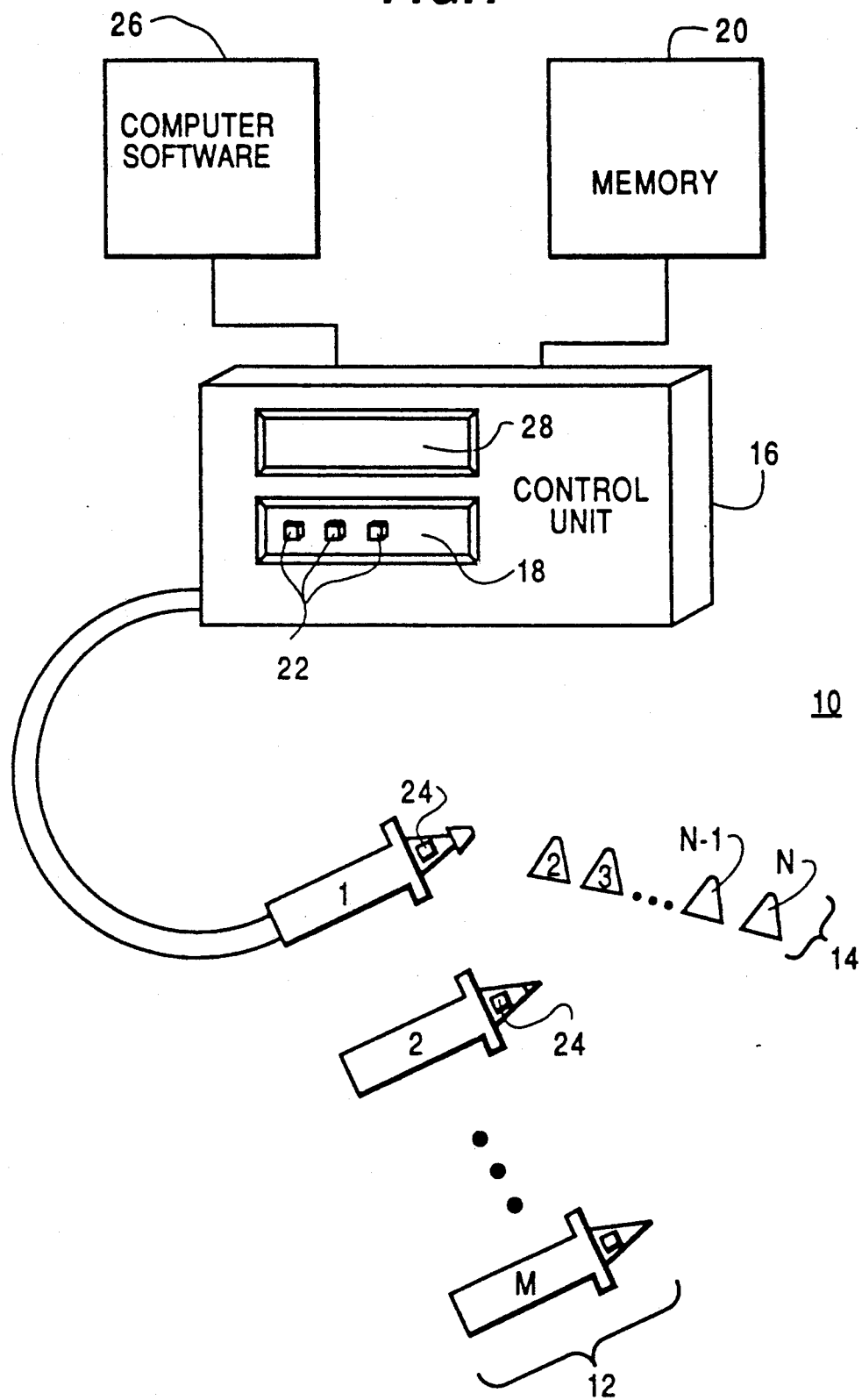
FIG. 1 is a schematic representation of a soldering system.

Referring now to the drawings wherein like reference numerals represent correspond or identical parts throughout the several views, and more specifically, referring to FIG. 1 thereof, there is shown a schematic representation of a soldering system 10. The soldering system 10 comprises M soldering tools 12, where M is an integer $\geq 1$, and N soldering tips 14, where N is an integer $\geq 1$. One of the N tips 14 is attached to one of the M soldering tools 12. The soldering system 10 also includes a control circuit 16 connected to the one tool 12 having the one tip 14 attached thereto, that among other things, maintains tip 14 at a desired temperature. Control circuit 16 includes a typical computer keyboard 18 for inputting the desired temperature although only three keys 22 are needed for this purpose.

Preferably, each of the N tips 14 has an identity, and each of the M tools 12 has a identity made by numbers, letters, or both, although other identification means may be employed. Similarly, the control circuit 16 has the capacity for determining the identity of the selected tool 12 to which it is connected. The control circuit 16 identifies which of the N tips 14 is attached to tool 12 via information inputted into the control circuit 16 through the input means 18.

The control circuit 16 includes a memory 20 for storing data relating to thermodynamic properties for M tools 12 and N tips 14. When the identity of the tool 12 connected to the control circuit 16 is made, the tip 14 is also identified through information received by the input means 18. Control circuit 16 maintains the tip 14 at the desired temperature based on the thermodynamic properties of the tool 12 and the tip 14 identified as noted above.

Soldering system 10 includes a tip temperature sensor 24 that is thermally connected to the tip 14 and produces a signal corresponding to the temperature of tip 14. The control circuit 16 preferably also includes a computer program 26 which maintains the tip 14 at a desired temperature based on the signal from the temperature sensor 24, the identity of the one tip 14 and the identity of the one tool 12 and the corresponding thermodynamic properties stored in the memory 20. A preferred embodiment of the source code of the program 26 is found in the appendix. Flow charts for the source code are set out in FIGS. 2–10, the operation of which will be described below.

For instance, the tool 12 can be either the WELLER ® EC1302, which consume 20 watts, or the WELLER ® EC1201P, which consumes 40 watts. The tips 14 associated with the EC1302 tool 12 can be for instance, those identified in Table 1 as follows:

TABLE 1

| TIP SELECTION CHART FOR WELLER® EC1302 TOOL | | | |
|---|---|---|---|
| NUMBER | STYLE | TIP | LENGTH |
| EPH101 | Conical | 1/64 wide | 7/16 |
| EPH102 | Bent Conical | 1/32 wide | 7/16 |
| EPH103 | Single Flat | 1/32 wide | 5/16 |
| EPH104 | Bent Conical | 3/64 wide | 7/16 |
| EPH105 | Single Flat | 3/64 wide | 5/16 |
| EPH106 | Screwdriver | 5/64 wide | 7/16 |
| EPH107 | Screwdriver | 5/64 wide | 7/16 |
| EPH109 | Conical | 1/32 wide | 7/16 |

The tips 14 that can be used with the EC1201P tool 12 can, for instance, be those that are found in Table 2 as follows:

TABLE 2

| TIP SELECTION CHART FOR WELLER® EC1201P TOOL | | | |
|---|---|---|---|
| NUMBER | STYLE | TIP | LENGTH |
| ETA | Screwdriver | 1/16 wide | 5/8 |
| ETB | Screwdriver | 3/32 wide | 5/8 |
| ETC | Screwdriver | 1/8 wide | 5/8 |
| ETCC | Single Flat | 1/8 wide | 5/8 |
| ETD | Screwdriver | 3/16 wide | 5/8 |
| ETDD | Single Flat | 3/16 wide | 5/8 |
| ETH | Screwdriver | 1/32 wide | 5/8 |
| ETK | Screwdriver | 3/64 wide | 1 |
| ETL | Screwdriver | 5/64 wide | 1 |
| ETM | Screwdriver | 1/8 wide | 1 |
| ETO | Conical | 1/32 wide | 1 |
| ETP | Conical | 1/32 wide | 5/8 |
| ETR | Screwdriver | 1/16 wide | 5/8 |
| ETS | Conical | 1/64 wide | 1 |

With respect to Tables 1 and 2, the column identified as NUMBER identifies the code number corresponding to a specific tip 14, the STYLE identifies the shape of the tip, the TIP identifies the width of the tip, and the LENGTH identifies the length of the tip outside the heater.

Figure 2:
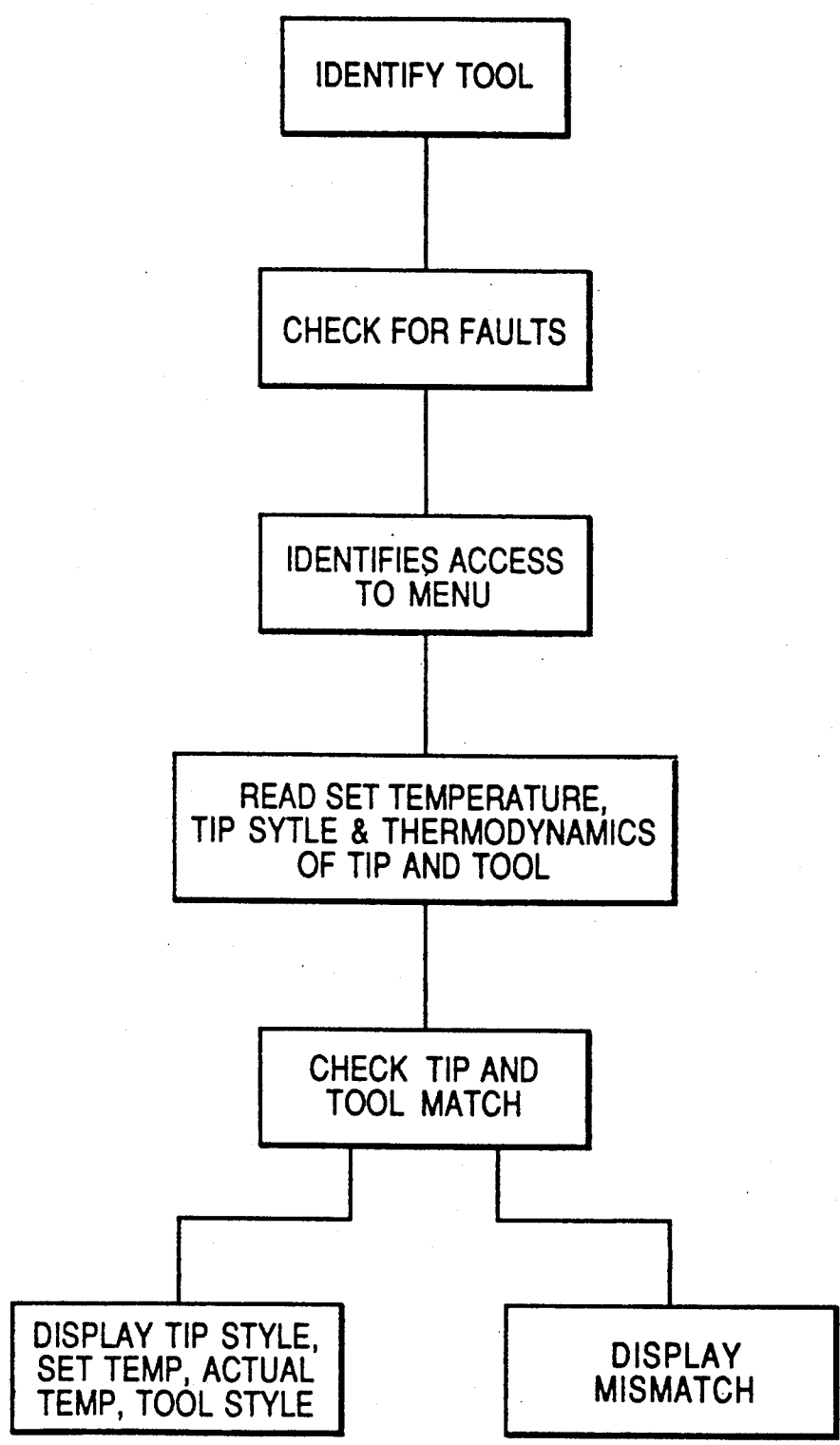
FIG. 2 is a flow chart of a computer software program for the soldering system.

As shown in FIG. 2, the software program 26 first identifies the tool 12 electrically connected to the control circuit 16. The tool 12 can be identified, for example, by the control circuit 16 identifying the heater resistance of the connected tool 12. The computer program 26 then checks for faults with the heater or sensor resistance (not shown) of the soldering system 10. The program then preferably identifies the level of access to the menu. For further access to the menu, the appropriate access code must be input into control circuit 16 through the keys 22.

The program, after the access level is identified, reads from the memory 20 the desired temperature at which the tip 14 is to be set, the style of the tip 14, and the thermodynamic properties associated with tip 14 and tool 12. In addition, tip 14 information stored and the tool 12 information are reviewed to determine if there is a proper match, that is, whether the tip 14 identified is compatible for use on the identified tool 12. If there is a mismatch between these elements, then the display 28 so indicates. If there is no mismatch, then the display 28 indicates the tip 14 style, the temperature set into the control circuit 16, the actual temperature of the tip 14, and the tool 12 style.

In the preferred embodiment of the program 26, there is included a menu that has various displays to assist a user with the operation of the soldering system 10. After tool 12 is connected to control circuit 16, through, for instance, a tool plug (not shown) that is inserted into, for example, a tool socket (not shown) on the front panel of the control circuit 16, and the power is turned on to the control circuit 16, the following appears on the display 28:

" WELLER MC5000 "
" REV D 12/13/88 "

where MC5000 stands for microprocessor controlled soldering station model number 5000, WELLER® is the name of the company, and the latest revision to the computer program 26 appears, here the fourth or "D" revision, and the date at which this revision occurred. At the same time, the tool 12 connected with the control circuit 16 is determined, for instance, if it is an EC1302 or an EC1201P tool 12. Additionally, the heater and sensor resistance is checked for any defects. If a problem is found, a defect message is displayed.

If no problem is found, then the following appears in the display:

" MENU ACCESS "
" ALLOWED "

This display indicates the level at which the user can interact with the program 26. The term "ALLOWED" indicates that full access is allowed, and the user is free to move through the menu and change various parameters such as tip style and set temperature. If instead of "ALLOWED" the term "TEMP AND TIP ONLY" appears, then a user can only change the set temperature or the tip style stored in the memory 20. If, instead, the term "DISALLOWED" appears under "MENU ACCESS", then it indicates to the user that no access is allowed without the proper access code being inputted into the control circuit 16 through the keys 22. (A more complete discussion of this follows.)

Next, after several seconds, there is, for example, displayed:

" SET 700° F. EC1201 "
" MENU?     ETA "

This display indicates what selected temperature has been stored, the stored tip 14 style and the installed tool 12. For instance, in this display, the stored temperature is 700° F., the tip style is ETA and the installed tool is EC1201. If, at this point, a user desires access to the menu of the software program 26, then the user only has to depress any key 22. (Note that what appears next in the display depends on what access level has been stored in the memory 20. If full access is allowed, then a description of what appears sequentially on the display with respect to the menu follows. A discussion of what appears on the display 28 if an access other than full access is available is discussed in more detail below.)

If no key 22 is depressed by the user, then the computer software 26 defaults to normal operation of the soldering system 10; that is, the tip 14 is allowed to heat to the set temperature and the soldering tool 12 and tip 14 are ready for a soldering operation.

However, if the tip 14 and tool 12 are not compatible, the following display appears:

" SET 700° F. EC1201    "
" TIP     MISMATCH "

This display appears in the event that the stored tip 14 style is not a usable tip 14 for the installed tool 12. If access to the tip style menu display is allowed, the computer software 26 defaults to the tip 14 style menu display. (Note that this also occurs if the access is limited to the set temperature and tip style mode.) If no menu access is allowed, the computer software 26 defaults to the access code input menu display (discussed below).

In the event that no key 22 is depressed, and there is no tip 14/tool 12 mismatch, the computer software 26 defaults to normal operation. What then appears on the display is, for example:

" SET 700° F. EC1201 "
" TIP 700° F.    ETA "

This indicates the set temperature, installed tool 12 style, actual tip temperature, and selected tip 14 style. With respect to this specific display, the desired set temperature is 700° F., the installed tool 12 style is EC1201, the actual tip 14 temperature is 700° F., and the selected tip 14 style is ETA.

In the event that a user depresses any one of the three keys 22, then the following display, for example, appears and power to the heater is deactivated. (Note that the menu may be accessed by a user by depressing any key 22 during normal operation.)

" SET TEMP = 700° F. " ⟵⟶ " CHANGE?    "
"                            "  " NO EXIT YES "

Figure 3:
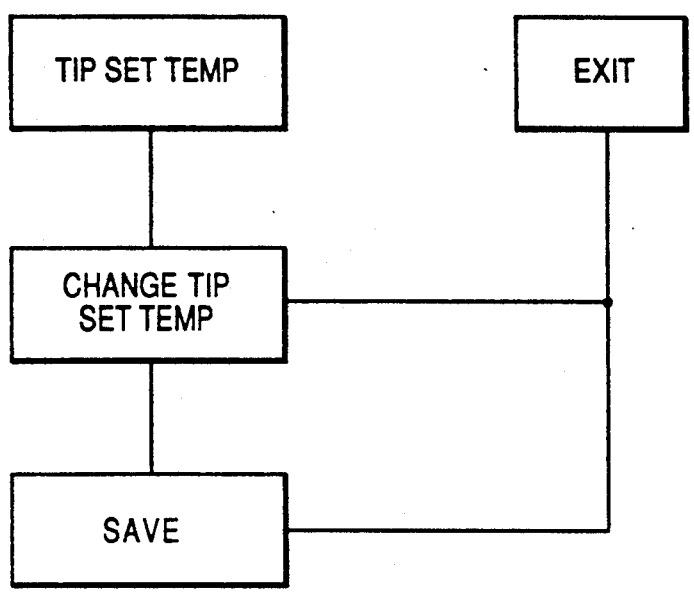
FIG. 3 is a flow chart of a subroutine of the computer software program with respect to the tip temperature.
Figure 5:
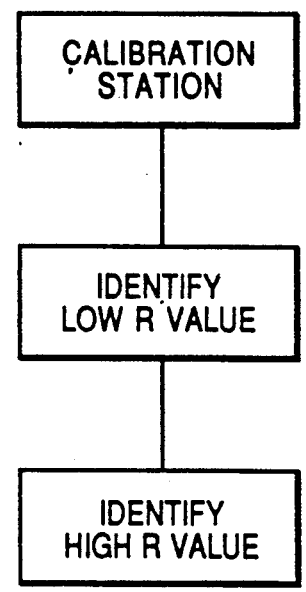
FIG. 5 is a flow chart of the computer software program with respect to the calibration station.
Figure 4:
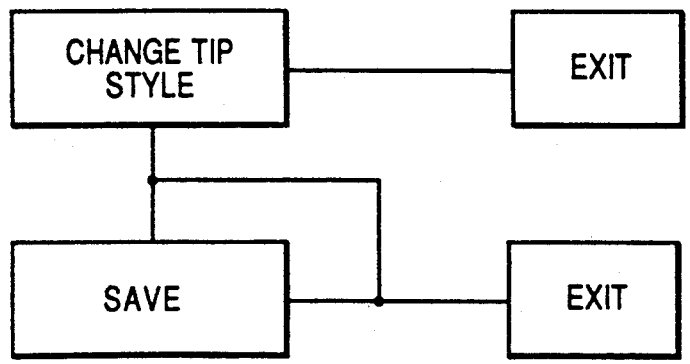
FIG. 4 is a flow chart of the computer software program with respect to the tip style.
Figure 6:
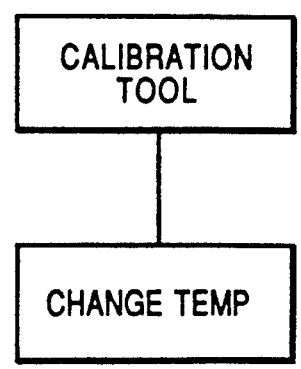
FIG. 6 is a flow chart of the computer software program with respect to the calibration of a specific tool.
Figure 7:
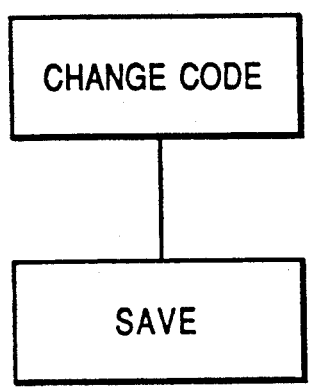
FIG. 7 is a flow chart of the computer software program with respect to changing the access code.
Figure 8:
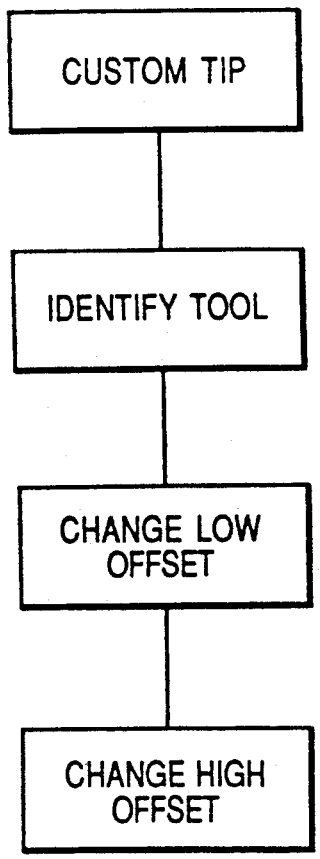
FIG. 8 is a flow chart of the computer software program with respect to a custom tip.
Figure 9:
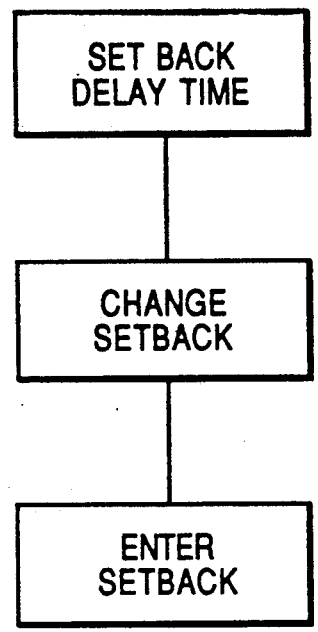
FIG. 9 is a flow chart of the computer software program for changing the setback delay time.

The first screen of this display indicates the set temperature stored in the memory 20. In this case, SET TEMP=700 F. indicates that the stored set temperature is 700° F. The two screens of this display alternate between displays about one second per screen. If the set temperature is correct, then the user can depress the key associated with NO on the second screen and the menu continues on to the next display. If the user wishes to exit from the menu to return to normal operation, then the key associated with EXIT is depressed by the user. IF the set temperature is not correct, then the user depresses the key associated with YES to change the set temperature. See FIG. 3 showing the flow chart of the software program with respect to the setting of the temperature. (Note that there are three keys 22. The term associated with each key 22 in a given display is determined by the position of the key 22 relative to the term with which it is associated. For instance, in the aforementioned display, the leftmost key 22 is associated with the term NO, the middle key 22 with the term EXIT, and the rightmost key with the term YES. This association is applicable for each display of the menu where input is possible.)

In the event the YES key is depressed, then the following display, for example, appears:

" SET TEMP = 700° F.  "
" UP  ENTER  DOWN "

The first line of this display indicates the current set temperature stored in the control circuit 16. The second line indicates the options available to the user to manipulate the set temperature. Depressing the UP key increases the set temperature, and depressing the DOWN key decreases the set temperature, by changing the digits of the set temperature starting with the most significant digit. The UP and DOWN keys 22 automatically repeat if they are held down by the user. The digit being set blinks during the process. By depressing the ENTER key, the user inputs the set temperature indicated on the first line of this display into the control circuit 16. The following display, for example, appears:

" SET TEMP = 700° F. "
" YES       NO "

The first line identifies the current set temperature value. If the set temperature is correct, the YES key is depressed to verify that it is the desired set temperature. If it is not the desired set temperature, the NO key is depressed to change the set temperature again according to the previous display. If the YES key is depressed and the set temperature is a value different from the previously determined set temperature, the following display appears:

" SET TEMP = 700° F. "
"      SAVE  NO "

The first line indicates the set temperature. The term SAVE on the second line allows the user to store the set temperature over time, that is, for use when the soldering system 10 is turned off and then on again. The NO key allows the user to use the tip 14 at the indicated set temperature but does not store the indicated set temperature after the soldering system 10 is turned off. Soldering system 10 will restore the last saved value of set temperature when turned off and then turned on.

If the YES key of the verification display is depressed by the user, or the user has depressed either the SAVE key or the NO key of the SAVE set temperature display, the following screen, for example, appears:

" TIP = ETA " ⟵⟶ "    CHANGE?    "
"          "           " NO EXIT YES "

Depressing the NO key in the second screen of this display indicates that the tip 14 style displayed in the first screen is correct and the menu moves on to the next display. If the user depressed the EXIT key, the computer software program 26 leaves the menu and returns the soldering system 10 to normal operation. Depressing the YES key allows the user to change the tip 14 style (see FIG. 4, which is a flow chart of the program 26 with respect to tip style) and the following display, for example, appears if the EC1201P tool is connected to the control circuit 16:

" SELECT SERIES "
" ET       SMT "

The ET key selects standard ET tips 14; the SMT key selects surface mount tip styles for review in the following display, for example. The following display also appears after the CHANGE TIP display when the EC1302P tool is attached to the control circuit 16:

" TIP = EPH101 "
" YES      NO "

Depressing the YES key with respect to this display enters the selected tip 14 style into memory 20. For instance, TIP=EPH101 indicates the style of the tip 14 as EPH101. If the tip style is the same as the stored tip 14 style, then the menu continues on to the next display. If the user depressed the NO key, as long as the NO key is held down, the software program 26 sequentially scrolls through the tip 14 styles applicable to the installed tool 12 that are stored in memory 20. When a desired tip 14 style appears in the display, the NO key is released, and the YES key is depressed, the following display, for example, appears:

" EPH109 TIP "
" SAVE    NO "

Depressing the SAVE key stores the indicated selected tip 14 style. Depressing the NO key allows the indicated tip 14 style to be used but not stored for subsequent use after the soldering system 10 is turned off.

The next display on the menu, which appears after the YES key of the selected tip style display is depressed or after the SAVE or NO key of the selected tip store display is depressed, is, for example:

" CALIB. STATION? "
" NO    EXIT    YES "

Depressing the NO key indicates that the control circuit 16 is not to be calibrated. Depressing the EXIT key causes the program 26 to leave the menu and return the soldering system 10 to normal operation. (See FIG. 5, which is a flow chart of the program 26 with respect to the control circuit 16 calibration.) Depressing the YES key by a user allows the control circuit 16 to be calibrated and results in the following display appearing:

" CONNECT LOW RES. "
" DEPRESS ANY KEY "

In this display, instructions appear to the user with respect to the calibration of the control circuit 16. It tells the user to connect a resistor of a known value (between 20.3 and 21.7 ohms, preferably 21.0 ohms) to a specific location in the control circuit 16 in place of the tool 12. Then, any of the three keys 22 can be depressed for the next display to appear, which is as follows:

" RES. = 21.0 OHMS "
" UP    ENTER    DOWN "

The actual resistor value that has been attached to the control circuit 16 is then entered either by depressing the UP key to increase the stored resistance value or by depressing the DOWN key to decrease the stored resistance value. The resistance changes in increments of 0. ohm with each depression of either the UP key or the DOWN key in the respective direction. Both the UP and DOWn keys automatically repeat their respective movement of resistance value if held down. Once the desired resistance value is obtained, the ENTER key is depressed to input the set value of the attached resistor. Then the following display appears:

" CONNECT HIGH RES. "
" DEPRESS    ANY KEY "

When this display appears, the user is instructed to connect a resistor of known value (between 53.0 and 56.8 ohms, preferably 54.9 ohms) to the control circuit 16. When any one of the three keys 22 is depressed, the following display appears:

" RES. = 54.9 OHMS "
" UP    ENTER    DOWN "

In a similar manner as with respect to the low resistor, the actual resistance value of the high resistor is inputted into the control circuit 16. The program 26 then calculates and stores the calibration constants for use during normal operation.

The next display in the menu of the computer software program 26 is the following:

" CALIBRATE TOOL? "
" NO    EXIT    YES "

Depressing the NO key by a user indicates that calibration of the sensor 24 of the tool 12 is not desired. (See FIG. 6, which is a flow chart of the program 26 with respect to the tool 12 calibration.) The menu then continues on the next display. If the EXIT key is depressed by a user, then the software program 26 leaves the menu and returns the soldering system 10 to normal operation. If the YES key is depressed, then the user is able to calibrate the sensor 24 of the tool 12 and the following display appears:

" SENSOR = 75.0 F "
" UP    ENTER    DOWN "

In this display, the first line identifies the temperature readout of the sensor. (The actual temperature readout also blinks during the calibration procedure to differentiate between actual and set values.) This sensor readout, for example, 75.0° F., indicates the actual temperature sensed by the sensor. When the readout is stable, for example, with the temperature not changing for a minute or two, the user then inputs the actual temperature of the environment surrounding the sensor 24. If the actual temperature is greater than what the sensor readout is, then the UP key is depressed to increase by increments of 0.5 degree the temperature readout to the actual value. If the temperature readout is greater than the actual value, then the DOWN key is depressed until the correct temperature readout is displayed. Both the UP and DOWN keys automatically repeat if they are held down. Once the appropriate value is present on the display, the ENTER key is depressed and the control circuit 16 calculates and stores the correct calibration constant to calibrate the sensor for accurate use during normal operation. Note that the environment for testing the sensor can include, for example, the air surrounding the sensor at its ambient temperature, or an ice bath in which the temperature sensor is submerged.

The next display in the menu appears as follows:

" CODE = 0000 "    ⟷    " CHANGE? "
"            "             " NO    EXIT    YES "

Alternating screens as above, depressing the NO key of the second screen of this display indicates that the user does not desire to change the access code number, and the menu continues to the custom tip display. (See FIG. 7, which is a flow chart of the program 26 with respect to change of the access code.) Depressing the EXIT key causes the program 26 to leave the menu and return the soldering system 10 to normal operation. Depressing the YES key causes the following display to appear:

" CODE = 0000 "
" UP   ENTER   DOWN "

The program 26 is prepared such that only the code number "0000∞ allows full menu access. Code numbers between "0001" and "4999" inclusive allow only tip 14 styles and set temperature inputs. Code numbers from "5000" through "9999" inclusive inhibit all menu access. By inputting the correct access code, the menu is accessed and the menu parameters including access code can then be changed. To enter the access code, the UP key of this display is depressed, causing the digits starting with the most significant digit to increase. If a decrease in the current digit is desired, the DOWN key is depressed, causing the digits to decrease starting with the most significant digit. The UP and DOWN keys automatically repeat if held down. The digit being set blinks during this procedure. Once the desired digit is displayed, then the ENTER key is depressed to input the displayed access code digit value and the above screen, for example, is changed to:

" CODE = 1234 "
" YES         NO "

By depressing the YES key, the user indicates that the access code displayed is correct, and the menu continues with the custom tip display. Depressing the NO key indicates that the access code is not correct and causes the menu to return to the previous display so that a correct access code can be chosen.

The next display in the menu is the following:

" CUSTOM TIP "
" NO   EXIT   YES "

If the NO key is depressed, there is no desired to input any custom tip 14 parameters and the menu continues to the next display. (See FIG. 8, which is a flow chart of the program 26 with respect to custom tip input.) Depressing the EXIT key causes the program 26 to leave the menu and the soldering system 10 returns to normal operation. Depressing the YES key enables the user to input custom tip 14 parameters, and the following display, for example, appears:

" TOOL STYLE ? "
" 1201   SAME   1302 "

Depressing the 1201 key indicates that the custom tip 14 being identified is for use with the 1201 tool 12 style. Depressing the 1302 key indicates that the custom tip 14 being identified is for use with the 1302 tool style. Depressing the SAME key causes the program 26 to review the tip 14 data stored in the memory 20. If either the 1201 key or the 1302 key is depressed, then the following display appears:

" LOW OFFSET = 11.5 "
" UP   ENTER   DOWN "

Depressing the UP key increases the set value for the custom tip 14 by 0.1; depressing the DOWN key decreases the value for the custom tip 14 by 0.5. Both the UP and DOWn keys automatically repeat as long as they are held down. Once the proper low offset is obtained, the ENTER key is depressed to input the low effect value and the following display appears:

" HIGH OFFSET = 37.5 "
" UP   ENTER   DOWN "

Depressing the UP key increases the high offset value of the subject custom tip 14 by 0.5; depressing the DOWN key decreases the high offset value of the subject custom tip 14 by 0.5. By holding down the UP or DOWN keys, the set value is either increased or decreased, respectively, automatically. By depressing the ENTER key, the selected high offset value is inputted into the control circuit 16.

The next display to appear after the custom tip screen is, for example:

" SETBACK = 15 MIN "   ⟷   " CHANGE? "
                                 " NO   EXIT   YES "

Depressing the NO key of the second screen of this display, which alternates with the first screen every second, causes the thermal delay setback time displayed to be saved and for the menu to move to the DISPLAY MODE display. (The setback time is the time period of inactivity of the tool 12 that must pass before the temperature of the tip 14 is lowered to preserve the tip 14.) If the EXIT key is depressed, the program 26 leaves the menu and returns the soldering system 10 to normal operation. If the NO key is depressed, then the following display, for example, appears:

" SETBACK = 15 MIN "
" UP   ENTER   DOWN "

Depressing the UP key increases the setback time by increments of 1 minute. Depressing the DOWN key decreases the setback time by increments of 1 minute. By holding down the UP or DOWN key, the setback value is automatically increased or decreased, respectively. Depressing the ENTER key causes the setback value to be inputted into the memory and the following display, for example, appears:

" SETBACK = 14 MIN "
" YES         NO "

Depression of the YES key indicates that the setback time is correct and the menu moves on to the next display. Depression of the NO key returns the menu to the previous screen to change the setback delay time again. Values from 1 minutes to 99 minutes may be entered; if a value of 0 minutes is entered, there will be no temperature setback.

"DISPLAY MODE=F "   ⟷   " CHANGE? "
                                 " NO   EXIT   YES "

Depressing the NO key of the second screen of this display indicates that the stored temperature mode, either F for Fahrenheit or C for Centigrade is correct and the menu returns to the set temperature display.

Figure 10:
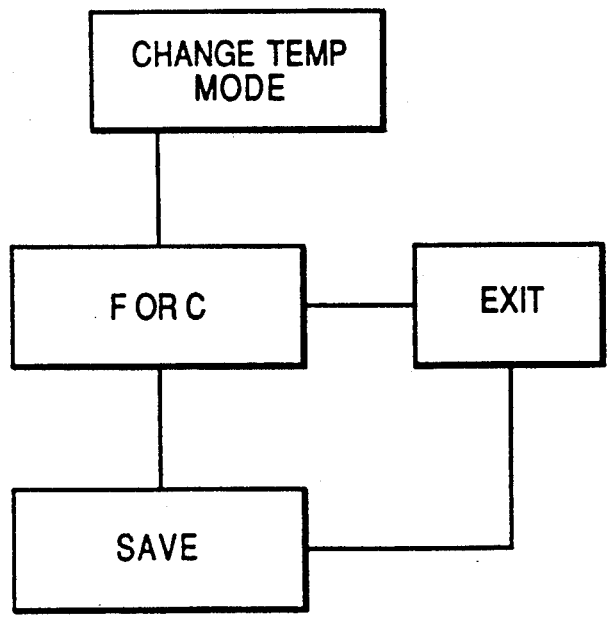
FIG. 10 is a flow chart of the computer software program for changing the temperature mode.

(See FIG. 10 which is a flow chart of the program 26 with respect to temperature mode.) If the EXIT key is depressed, the menu is left and the soldering system continues with normal operation. Depressing the YES key changes the temperature mode and the following display, for example, appears:

" DISPLAY MODE=C "
" YES          NO "

Depressing the YES key enters the selected temperature mode. If the temperature mode is the same as the stored mode, the menu returns to the set temperature display. If the user depressed the NO key, then the temperature mode changes from F to C or from C to F depending on what is the first mode present. If the mode is other than the stored mode, then the depression of the YES key results in the following display, for example, appearing:

" DISPLAY MODE=F "
"    SAVE       NO "

Depressing the SAVE key stores the selected mode for subsequent use after the soldering system 10 is turned off. If the NO key is depressed by the user, then the selected mode is used when normal operation is resumed but the selected mode is not stored for subsequent use after the soldering system 10 is turned off.

The menu sequence that is displayed with the set temperature and tip style access only available is the following: The first display that appears is, for example " SET TEMP = 700 F "  ⟷  "    CHANGE?    "
"                   "     " NO   EXIT   YES "

The displays that follow if the YES key of this display is depressed are those that have already been identified above with respect to the set temperature display. The next display that appears if the NO key of the aforementioned display is depressed is the following:

" TIP = ETA "  ⟷  "    CHANGE?    "
"           "     " NO   EXIT   YES "

The displays that follow if the YES key of this display is depressed are the same as those described above with respect to the select tip style display. If the NO key of this display is depressed, then the following display appears:

" ENTER CODE? "
" NO        YES "

If the YES key of this display is depressed by a user, then the user is able to enter an access code into the control circuit 16 and the following display, for example, appears:

" CODE = 0000? "
" UP   ENTER   DOWN "

By depressing the UP key, the user causes the code number to be inputted for access to be increased starting with the most significant digit. By depressing the DOWN key, the user decreases the digits of the displayed code numbers starting with the most significant digit. By holding down the UP or the DOWN keys continuously, the digits are increased or decreased, respectively, continuously. The digit being set blinks during this procedure. Once the desired digit is displayed, the ENTER key is depressed to input the digit value. If the correct code is entered, full access to the menu is allowed; otherwise, the soldering system 10 returns to normal operation.

If the user has full menu access, but tip 14 and tool 12 mismatch is detected at turn on, then the following display, for example, appears:

" TIP = ETA "  ⟷  "    CHANGE?    "
"           "     " NO   EXIT   YES "

In this display, an allowable tip 14 for the installed tool 12 is shown. If the YES key is depressed, then the same displays appears as those described above with respect to the select tip style display. If the EXIT key is depressed, the program 26 leaves the menu and returns the soldering system 10 to normal operation. If the NO key is depressed, the next display that, for example, appears is the following:

" SET TEMP = 700F "  ⟷  "    CHANGE?    "
"YES   EXIT   NO "     " NO   EXIT   YES "

The displays that follow and the possible results that are obtained with respect to the soldering system 10 are those that have been described above with respect to the set tip temperature display.

With the menu access limited to set temperature and tip style access only and with a tip mismatch detected by the program 26, the same sequence with respect to the menu occurs as described above when full menu access is present and a tip 14/tool 12 mismatch is detected. However, in addition, the code input for menu access display appears. If the YES key of this display is depressed, then the input code display appears and the user can input the proper access code to obtain full access to the menu.

The menu sequence that appears if menu access is disabled and the menu is requested is, for example:

" CODE = 0000 ? "
" UP   ENTER   DOWN "

Depressing the UP or DOWN key increments or decrements, respectively, starting with the most significant digit. If the UP or DOWN keys are held down continuously, then change continues automatically. The digit being changed blinks for highlighting purposes.

Figure 11A:
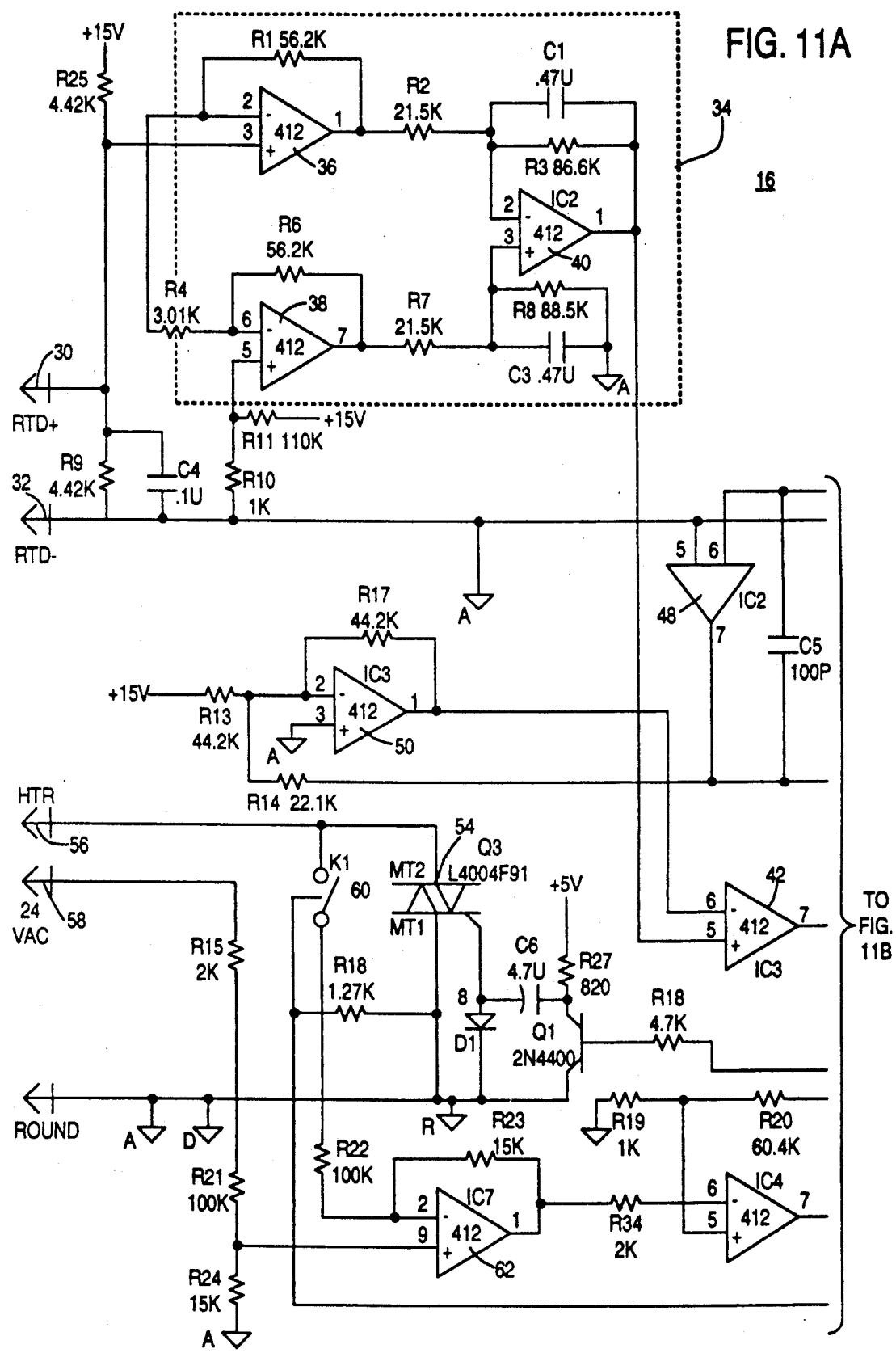
FIGS. 11A–11C are schematic diagrams of an embodiment of a control circuit for the soldering system.
Figure 11B:
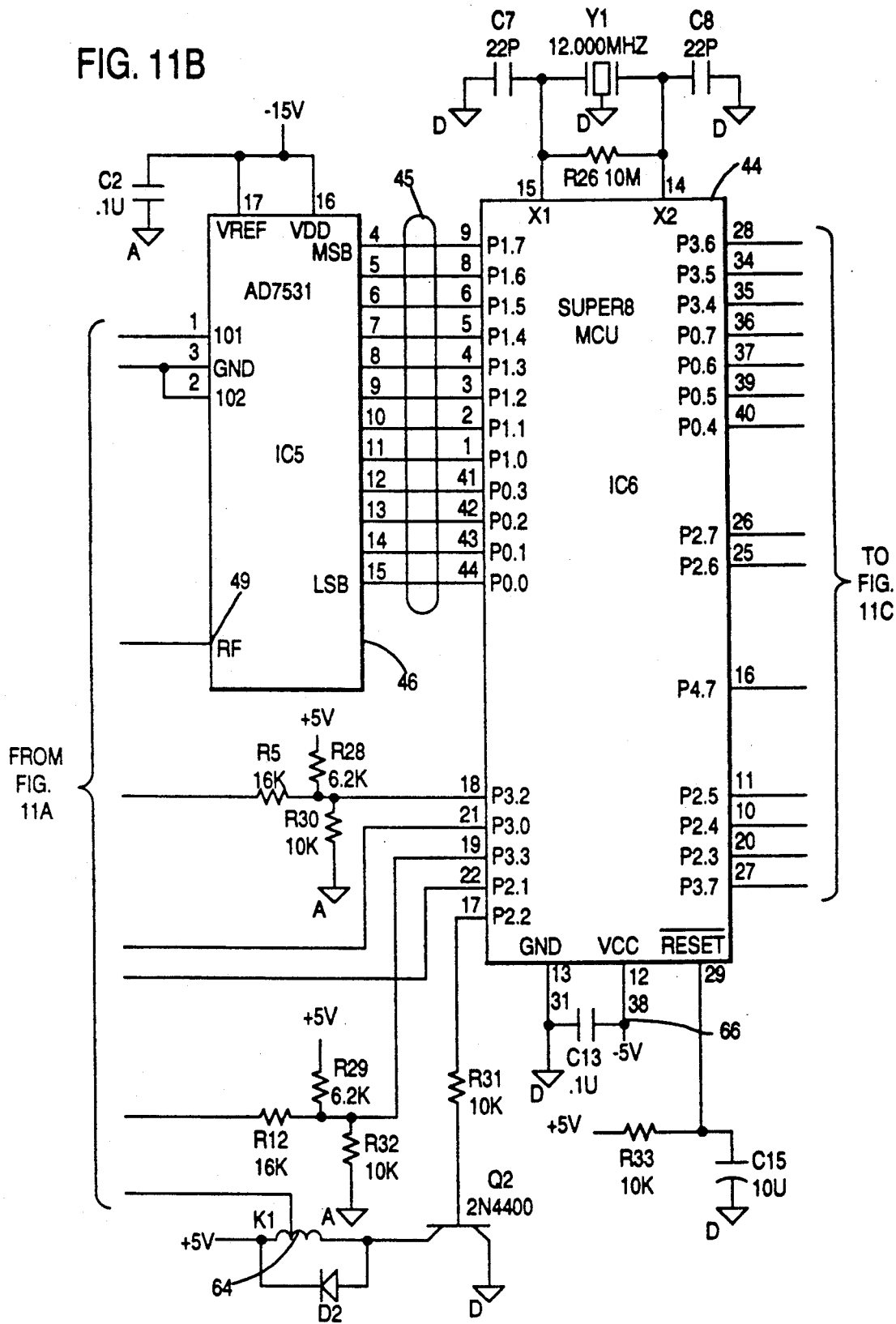
Figure 11C:
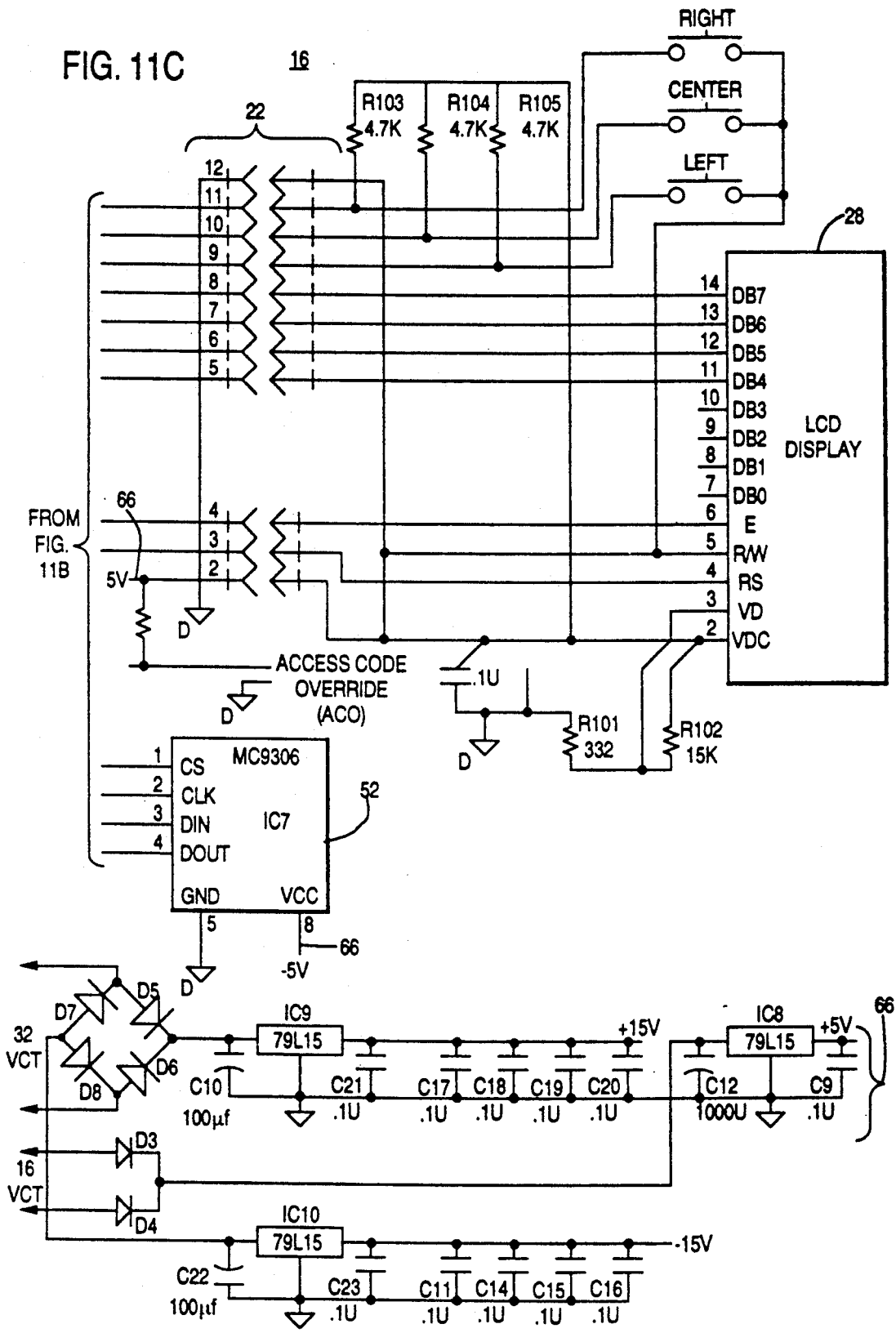

Referring to FIGS. 11A–11C, there is shown a schematic diagram of a preferred embodiment of the control circuit 16. The tool 12 is electrically connected to the control circuit 16 at pins 30 and 32. Note that pins 30 and 32 are also where the known high and low resistor values are connected for purposes of calibration of the control circuit 16. The control circuit 16, through pins 30 and 32, is electrically connected to the tool 12 and to the temperature sensor 24 therein which senses the temperature of the tip 14. The temperature sensor 24 has essentially a variable resistor whose resistance value corresponds to the tip 14 temperature. The resistance value of the temperature sensor 24 is received through pins 30 and 32 via a signal. The pins 30 and 32 are also electrically connected to an instrumentation amplifier 34 which receives the signal corresponding to the resistance of the temperature sensor 24. The instrumentation amplifier 34 includes a first operational amplifier 36, a second operational amplifier 38, and a third operational amplifier 40. The output of the third operational amplifier 40 is a voltage signal which corresponds to the resistance of the sensor 24. This actual sensor voltage signal produced by the third operational amplifier 40 is inputted into a comparator 42 as a voltage signal corresponding to a desired temperature for the tip 14. The comparator 42 compares the desired signal with the actual sensor voltage signal and produces a signal which is received by a microprocessing chip 44. The signal produced by the comparator 42 and received by the microprocessor 44 is reviewed by the program 26 in the microprocessor 44 to determine whether or not current must be provided to the tip 14 in order to achieve a set temperature in the tip 14. The reception of the signal produced by the comparator 42 thus identifies the actual temperature of the tip 14.

The desired voltage signal received by the comparator 42 is produced by the microprocessor 44 by first producing a series of digital signals and providing them to a digital-to-analog converter 46 with which it is electrically connected. The digital-to-analog converter 46 then produces a signal that is received by a fourth operational amplifier 48 which essentially produces a voltage signal corresponding to the desired set temperature of the tip 14. The output of the fourth operational amplifier 48 is then received by a fifth operational amplifier 50. The fifth operational amplifier 50 translates the voltage signal into a bi-polar signal which is then in a form that can be received by the comparator 42 and compared to the actual signal also received by the comparator 42. Note that the voltage signal produced by the fourth operational amplifier 48 is also fed back to the digital-to-analog converter 46 through pin 49 in order for the digital-to-analog converter 46 to produce a more accurate signal.

Keys 22 are electrically connected to the microprocessor 44 as well as the display 28. Also electrically connected to the microprocessor 44 is an EEPROM 52 wherein such parameters as set temperature and tip 14 style are stored such that they are retained when the soldering system 10 is turned off. The EEPROM 52 is a part of memory 20.

After the microprocessor 44 receives the output signal from the comparator 42, and determines whether the heater (not shown) needs to have current provided to it in order to heat the tip 14 to a desired temperature, or to stop current to allow the temperature of the tip 14 to lessen, a signal corresponding to the desired increase or decrease in the tip 14 temperature is produced by the microprocessor 44. This modification is received by a triac 54 which is essentially a thyristor. The modification signal is provided to the gate of the thyristor, causing it to turn on and provide current to the tool 12 through pin 56. At the same time, through pin 58, which is also connected to the tool 12, 24-volt alternating current is provided to the tool. When the thyristor is triggered by a signal from the microprocessor 44 inputted into the thyristor gate causing current to pass through pin 56 into the tool 12, essentially an electrical loop is closed and the 24-volt alternating current from pin 58 causes the heater (not shown) to heat until the desired set temperature is reached. When the set temperature is reached, it is sensed by the sensor 24, which provides a signal, as described above, back to the microprocessor 44, shutting down the modification signal. This, in turn, causes the thyristor to stop providing alternating current to the tool 12, and thus prevents the 24-volt alternating current from heating the tip 14.

When the tool 12 is first activated, a switch 60 is closed to allow a signal corresponding to the resistance of the tool 12 to be received by a sixth operational amplifier 62. The output of the sixth operational amplifier 62 corresponds to the resistance of the tool 12 which identified whether the tool 12 is the 20-watt tool 12 or the 40-watt tool 12, or whether the resistance is other than that associated with the 20-watt tool 12 or the 40-watt tool 12. The signal for the sixth operational amplifier 62 is provided to the microprocessor 44, where the software 26 therein determines which tool 12 is connected to the control circuit 16 or if there is a fault, which is so displayed on the display 28. The program also determines whether the tip style stored in the EEPROM 52 is compatible with the identified tool 12. If the tip 14 style stored in the EEPROM 52 is not compatible with the tool 12, then a mismatch is displayed on the display 28. After the initial determination of the tool 12 occurs and whether there is any fault or mismatch therewith, a coil 64 causes the switch 60 to open. At such time and thereafter during the normal operation of the soldering system 10, the sixth operational amplifier 62 essentially identifies the zero crossing points of the 24-volt alternating current, which is also inputted into the sixth operational amplifier 62. The output of the sixth operational amplifier 62 ultimately causes the triac 54 to trigger at the proper time so little or no noise or error is present in the current signal provided to the tool 12 through pin 56. A power supply 66 is present to provide power to the control circuit 16. For instance, from the power supply 66, five volts is provided to the microprocessor 44, the display 28, and the EEPROM 52.

With respect to calibration of the tool 12, the known high and low resistance values connected to pins 30 and 32 are determined by the computer the same way as the resistance value of the sensor 24 is determined when the tool 12 is electrically connected to pins 30 and 32. When the actual resistance is inputted into program 26 of the known high and low resistances, the program then uses the inputted information to insert the resistance values the control circuit is identifying at pins 30 and 32.

Although the invention has been described in detail in the foregoing embodiments for the purpose of illustration, it is to be understood that such detail is solely for that purpose and that variations can be made therein by those skilled in the art without departing form the spirit and scope of the inventions except as it may be described by the following claims.

What is claimed is:

1. A soldering system comprising:
   (a) M soldering tools, where M≧1 and is an integer, N soldering tips, where N≧1 and is an integer, with one of the N tips attached to one of the M soldering tools, each of the N tips have an identity, and each of the M tools having an identity; and
   (b) a control circuit including a memory containing data having thermodynamic properties with respect to the M tools and the N tips, said control circuit connected to the one tool having the one tip attached to it, said control circuit maintaining the one tip at a desired temperature, said control circuit having input means for inputting the desired temperature at which the control circuit maintains the temperature of the one tip, said control circuit maintaining the one tip attached to the one tool at a desired temperature which is inputted into the control circuit through the input means, said control circuit identifying which one of the N tips is attached to the one tool being inputted into the control circuit through the input means, and wherein the control circuit has means for determining the identity of the one tool connected to the control circuit, the control circuit further including a memory containing data having thermodynamic properties with respect to the M tools and N tips such that when the identity of the one tool connected to the control circuit is identified by the determining means and the one tip is identified through the input means, the control circuit maintains the tip at the desired temperature based on the thermodynamic properties of the one tool and the one tip that is connected to the one tool.

2. A system as described in claim 1 wherein the input means is a keyboard.

3. A system as described in claim 2 including a tip temperature sensor thermally connected to the tip which produces a signal corresponding to the temperature of the tip and wherein the control circuit includes a computer program which maintains the tip at the desired temperature based on the signal from the temperature sensor, the identity of the one tip and the identity of one tool and the corresponding thermodynamic properties thereof that are in the memory.

4. A computer controlled soldering apparatus with a connector for connection to a power source comprising:
   (a) a number of soldering tools, each of said tools having its own respective tool indicia;
   (b) a number of soldering tips for use with said soldering tools in a soldering operation, each of said tips having its own respective tip indicia;
   (c) heating means for heating said soldering tip to a preselected temperature;
   (d) an electrical control circuit for controlling said heating means;
   (e) a temperature sensor for sensing the temperature of said tip, said temperature sensor being connected to said control circuit;
   (f) programming means including a keyboard input for programming said circuit to maintain said preselected temperature, said keyboard being connected to said control circuit for inputting decimal numbers and letters corresponding to preselected temperature, a number of said soldering tools and a number of said soldering tips into said system;
   (g) a memory for storing data relating to said number of tips, number of tools, and said preselected temperature;
   (h) said keyboard input having said decimal numbers and letters corresponding to letters and numbers for identifying said tools, said tips and said temperature, said keyboard cooperating with said circuit to input tool indicia corresponding to a selected tool and tip indicia corresponding to a selected tip, said input being stored in said memory;
   (i) a display for displaying information input into said system;
   (j) said control circuit cooperating with said memory, said tip, said tool, said temperature sensor to control the temperature of said tip as preselected by the user, and said display cooperating with said control circuit to display said preselected temperature, the selected tool, the selected tip as input by the user.

5. The computer controlled soldering apparatus according to claim 4 wherein said memory includes a database of indicia for each of said tips, and said database including indicia for each of said tools, said circuit being programmed for a range of tips and tools at various temperature ranges wherein for certain preselected tips and corresponding tools for a particular range of preselected temperatures, the control circuit will maintain said tip at said preselected temperature during operation.

6. The computer controlled soldering apparatus according to claim 5 wherein said control circuit provides a warning when said preselected tool does not match said preselected tip for a preselected temperature range.

7. The computer controlled soldering apparatus according to claim 6 wherein said warning includes a display indicating that said tip does not match said tool for a particular preselected temperature range.

8. The computer controlled soldering apparatus according to claim 7 wherein said control circuit cooperates with said power source to cease the delivery of power to said heating means when there is a mismatch between said tip and said tool for a preselected temperature range.

9. The computer controlled apparatus according to claim 8 wherein said control circuit cooperates with said display where there is no mismatch to indicate a set temperature and the temperature at which the tip is being maintained.

10. The computer controlled soldering apparatus according to claim 9 wherein said heating means includes a resistor, further comprising means for calibrating the control circuit to compensate for a particular resistor value of the heating means.

11. The computer controller apparatus according to claim 10 further comprising means for adjusting the read out of the sensor temperature as displayed to correspond with the value of the temperature actually sensed.

12. The computer controlled soldering apparatus according to claim 11 further comprising means for selecting a time period of inactivity of the tool that must pass before the temperature of the tip is lowered to preserve the tip.

13. The computer controlled soldering apparatus according to claim 12 further comprising means for changing the temperature mode between degrees Centigrade and degrees Fahrenheit.

14. The computer controlled soldering apparatus according to claim 13 further comprising means for selecting and changing an access code and access level for the purpose of allowing or disallowing the user the ability to change the soldering apparatus' operating parameters with one or more levels of access.

* * * * *